March 29, 1966   H. RITZMANN   3,243,172
METHOD OF AND ARRANGEMENT FOR MAKING CEMENT CLINKER
Filed July 21, 1965
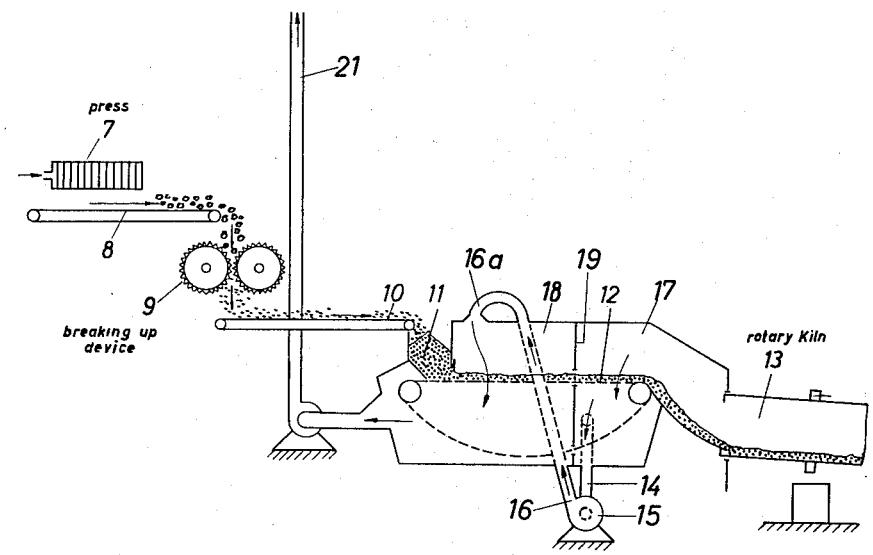

United States Patent Office 3,243,172
Patented Mar. 29, 1966

3,243,172
METHOD OF AND ARRANGEMENT FOR MAKING CEMENT CLINKER
Horst Ritzmann, Neubeckum, Westphalia, Germany, assignor to Polysius G.m.b.H., Neubeckum, Westphalia, Germany
Filed July 21, 1965, Ser. No. 480,226
Claims priority, application Germany, Nov. 21, 1962, P 30,617
4 Claims. (Cl. 263—32)

The present application is a continuation-in-part application of my copending application Ser. No. 322,832 filed November 12, 1963, now abandoned. The present invention relates to a method of and arrangement for producing cement clinker and more specifically, for producing goods to be burned in a kiln from a slurry filter cake of low porosity and from plastic raw materials, especially cement raw slurry, lime slurry, red slurry (Rotschlamm) as by-product in the mining of alumina, minerals, magnesite, dolomite, etc.

It is well known that some raw materials in the cement industry can advantageously be dressed in a wet process inasmuch as by washing or wet milling or both a thick slurry is produced from the raw material which slurry is well intermixable and, if necessary, can be corrected by additives. When employing chemical additives, as, for instance soda, it is frequently possible also to reduce the water content of the slurry. Inasmuch as the slurry must, however, have such consistency that it may be pumped, generally still from 32 to 36% of water is required in the slurry. This slurry is then burned to clinker in a wet process rotary kiln.

Raw materials are known in which the wet dressing is indispensable either for economical or for technical reasons. Unfortunately, however, the burning of the thick slurry requires considerable heat energy inasmuch as the evaporation of the slurry water requires a considerable portion of the total heat requirement for the burning process. Industry has been successful mechanically to dehydrate the raw slurry on suction filters without the employment of evaporation heat to such an extent (for instance from a 40% water content to a 20% water content) that from the thus obtained filter or press cake with the addition of dry substances (for instance dust from the kiln dust withdrawal installation) it was possible to produce granulated material. This conversion from raw slurry to granulated material makes possible the employment of the heat saving Lepol kiln. In this way, it has been made possible to reduce the heat requirement for burning of cement of from, for instance 1350 kilokalories per kilogram clinker (2430 B.t.u./lb.) to 900 kilokalories per kilogram clinker (1620 B.t.u./lb.). This minimum requirement of heat, even when considering the additional cost for the mechanical dehydration, represents a considerable reduction in the manufacturing costs of cement clinker.

Efforts have been made to extend the above-mentioned production method consisting of wet dressing, mechanical dehydration of the raw slurry and burning in a heat saving dry rotary kiln, to such raw materials which cannot be dehydrated by means of suction filtering. It has been found that the well-known filter press in which the raw slurry is dehydrated at a high pressure between filtering surfaces, is suitable also for the dehydration of such slurries which, due to their colloidal property (for instance chalk) cannot be dehydrated on suction filters. After this type of press has been automized (heretofore the various operations had to be initiated by hand), the press is also adapted for modern conditions.

It has been found, however, that the granulation of filter cake produced by means of a filter press while being possible greatly increases the heat sensitivity of the granular material. Therefore, the granular material is not able to withstand the heat treatment in the drying and preheating zone of the burning process. In this connection, it should be kept in mind that the porosity of the granular material produced from the filter cake is, even after a short stay in the granulating device, so low in view of sticking and smearing of the surface of the granular material that during the drying operation the steam cannot leave the granules, and consequently the granules will burst in view of the steam pressure.

It is also known to pass plastic raw material of low porosity through a kneading apparatus known per se in which a spattle, agitator, or the like, presses the plastic raw material through screen-like holes of the kneading apparatus in such a way that the pressure acts in an uneven manner upon the raw material in the holes whereby from said raw material small lumps are produced the surfaces of which show a plurality of tears extending up to the core of said lumps. These small lumps are then subjected to heat treatment.

The fact that the lumps have tears extending up to the core of the lumps overcomes the difficulties which occur during the drying of the lumps and the bursting produced in connection therewith. These lumps are properly temperature resistant against heat stresses on the grate.

In some instances, however, it is not possible by pressure filtration of a cement raw slurry to obtain a filter cake with sufficiently low water content so that the lumps produced in the kneading apparatus and provided with tears will have a low mechanical strength.

On the other hand, when deforming filter cake in a kneading device, occasionally due to thixotropic properties of the material a certain softening of the material occurs which likewise leads to the formation of softer lumps.

The lumps obtained in these instances have the desired and suitable structure but their resistance against changes as to form is low. Due to the unavoidable transport from the kneading apparatus to the preheater, the subjecting of the lumps to mechanical stress is always present. With too soft lumps, this results in a smearing of the tears and thus frequently in the elimination of the very desired and suitable structure. As a result thereof, also the desired heat resistance is reduced or might even be totally eliminated.

It is an object of the present invention to make possible a deformation of the plastic material in such a way that heat resistance lumps (Formlinge) will be obtained, and this also in cases where a higher filter cake humidity is encountered and/or thixotropic materials.

It is another object of the present invention to provide a method as set forth in the preceding paragragh in which the structure of the lumps or formed material which makes the same heat resistant will not be affected by further mechanical stresses to which said lumps may be subjected during their transport within the processing device.

These objects are of particular importance in connection with the fact that filter cakes produced in filter presses are, due to the method of production, rather solid. This is the fact also when the filter cake has a higher water content or contains thixotropic materials.

It is a further object of this invention to provide a simplified arrangement for carrying out the above-mentioned methods.

The invention will appear more clearly from the following specification and the attached drawing diagrammatically showing an arrangement for carrying out the method according to the present invention.

The present invention is characterized primarily in that the solid or hard filter cake obtained from filter presses is immediately following filter press by suitable breaking-up devices, such as porcupine rollers, cutting machines, or the like, broken up into small lumps while the capillary system or the passages which were formed during the filtration for the passage of water will be retained inside the lumps and will substantially also be maintained at the surface of the lumps. This system of passages makes it possible during the successive heat treatment on the grate to produce an unimpeded water evaporation without causing the lumps to burst. However, it is necessary that the size of the lumps be within a certain size range. More specifically, expressed in millimeter edge length of the approximately cubic lumps, the size of the lumps is preferably within the range of from 5 to 30 millimeters, since otherwise no unimpeded water evaporation without bursting of the lumps is possible.

The filter cake lumps thus brought to a suitable size have the same strength as the original filter cake inasmuch as they are not subject to any kneading or pressing operations. This form stability is sufficient during the transport to maintain the desired and suitable structure.

The method according to the invention for breaking up (for instance by porcupine rollers, cutting mills, or the like) the filter cake produced in filter presses to a size of from approximately 5 to 30 millimeters in such a way that the passage system formed during the filtration will be maintained, will thus permit a combination of the wet dressing of the raw material with the employment of a heat saving kiln, for instance a Lepol kiln.

The single figure of the drawing illustrates a structural arrangement for carrying out the invention.

This arrangement for carrying out the method according to the invention is illustrated by way of example in the attached drawing showing a press 7 for dehydrating the slurry. The thus formed cake drops onto the conveyor belt 8 and passes into the breaking-up device 9 in which the cake is broken up into small lumps. The thus formed lumps are by means of a further conveyor 10 passed to a charging funnel 11 of a Lepol grate 12. The Lepol grate 12 serves for heating treating the layer of material which consists of a charge of small lumps. By means of devices known per se, the flue gases of rotary kilns are passed twice through the lumps on the grate 12 and each time from the top. More specifically, the said device known per se comprises a first conduit 14 below the grate 12 which is connected to the suction side of a blower the pressure side of which has connected thereto a conduit 16 the mouth 16a of which leads to a station above grate 12. Thus, the flue gases from the rotary kiln 13 which as a rule have a temperature within a range of from 800° C. to 1000° C. pass first in chamber 17 from the top through the lumps on grate 12 into conduit 14 and after having been conveyed through conduit 16 into chamber 18, which is separated from chamber 17 by a partition 19, again pass through the lumps on grate 12. These flue gases are then finally withdrawn by a blower 20 and exhausted through a conduit 21. The temperature of the flue gases when being exhausted through conduit 21 may be for instance from 80° C. to 120° C. The heat treatment of the lumps while passing through chambers 18 and 17 may take from 15 to 45 minutes. The burning in the rotary kiln 13 takes place within a temperature range of from 1200° C. to 1600° C. and over a period of from 30 to 200 minutes.

It is, of course, to be understood that the present invention is, by no means, limited to the method and arrangement described above but also comprises any modifications within the scope of the appended claims. Thus, instead of a Lepol kiln comprising a Lepol grate 12 and a rotary kiln 13, also a sintering grate or another burning device may be employed. In such an instance the material to be burned is preferably spread out in form of a layer and is heat treated on a gas permeable conveyor while the heat treatment may be effected by flame heating or by mixed firing systems which have fuel in solid form finely distributed in the raw materials.

It is also to be noted that the method is not limited exclusively to material with a higher water content or with thixotropic properties, but the method is also applicable to other materials. The method according to the present invention is furthermore not limited solely to the cement industry. It is also to be noted that other raw materials may be employed which, due to their physical properties are particularly suitable for fuel saving heat treatment and can be employed only by the combined method of the present invention. Such materials are filter cakes from lime slurry, red slurry as waste material from the production of alumina, ores, magnesites and dolomites.

What I claim is:

1. In a method of preparing material to be burned in a kiln from a slurry of said material, the steps of treating the slurry in a filter press to remove water so as to form a moist, firm filter cake having capillary passages therein, severing said moist filter cake into discreet portions having said capillary passages therein for the passage of water during evaporation under heat, and heating said portions of the filter cake by passing heated gas through a layer of said portions to evaporate the water retained therein.

2. In a method of preparing material to be burned in a kiln from a slurry of said material, the steps of treating said slurry in a filter press to remove water so as to form a moist, firm filter cake having capillary passages therein, breaking said moist filter cake into discreet portions having a greatest diameter of the order of 25 to 30 millimeters and having capillary passages therein for the passage of water during evaporation under heat, and heating said discreet portions by passing heated gas through a layer of said portions to evaporate the water retained therein.

3. A method according to claim 2, in which the heating of said portions is effected by passing the gas therethrough twice at temperatures on the order of 800° C. to 1200° C. for a time period of from 15 to 45 minutes.

4. An arrangement for processing a slurry of raw material from which goods to be burned in a kiln have to be prepared, which includes as a filter press for dehydrating said slurry and transforming the same into firm filter cakes having passages therein, means for breaking up said filter cake into small pieces, means for conveying the filter cakes from said filter press to said breaking-up means for breaking up said filter cakes into small pieces, a rotary kiln having a flue gas passage, grate means interposed between said breaking-up means and said rotary kiln for conveying said pieces to said kiln, said grate means being arranged to receive the pieces broken up by said breaking-up means, and conduit means surrounding said grate means and having one end in communication with said kiln for conveying flue gases from said rotary kiln into and through said broken-up pieces on said grate means for drying said broken-up pieces.

No references cited.

JOHN J. CAMBY, *Primary Examiner.*